Oct. 26, 1954  J. L. CROWTHER  2,692,939
ANTIGLARE HEADLIGHT
Filed April 29, 1953

James L. Crowther
INVENTOR.

Patented Oct. 26, 1954

2,692,939

UNITED STATES PATENT OFFICE 2,692,939

ANTIGLARE HEADLIGHT

James L. Crowther, Martinsburg, W. Va.

Application April 29, 1953, Serial No. 351,881

1 Claim. (Cl. 240—46.41)

This invention relates to a light polarizing device and more particularly to means for reducing glare emanating from the headlights of an automobile.

Night driving is often tiring to operators of motor vehicles due to the glare emanating from headlights of approaching automobiles and other vehicles. While the headlights are absolutely necessary for safe night driving, many accidents are often caused due to temporary blindness induced by glare from the approaching vehicles. The headlights of most contemporary motor vehicles are provided with concave lenses which permit light rays to be emitted at a considerable angle relative to the path of the car thus causing glare which is certain to disturb the driver of another vehicle using a different lane even on a multi-lane highway. It is therefore the primary object of this invention to reduce the side glare emanating from automobile or other vehicle headlights to thus make night driving safer and more comfortable.

The construction of this invention particularly features means for supporting in spaced relationship to the illuminating lamp of the headlight a series of concentric rings of light polarizing material in such manner that light rays emanating at a relatively large angle to the path of the car will be prevented from passing beyond the headlight thus assuring an operator of a vehicle a proper amount of illumination directly/while reducing the side glare disturbing to other motorists.

Still further objects of the invention reside in the provision of an anti-glare headlight that is simple in construction and manufacture, capable of being readily installed in lieu of present and contemporary headlights, employing a minimum number of parts and of relatively low cost, and which is highly effective in reducing side glare.

Figure 1:
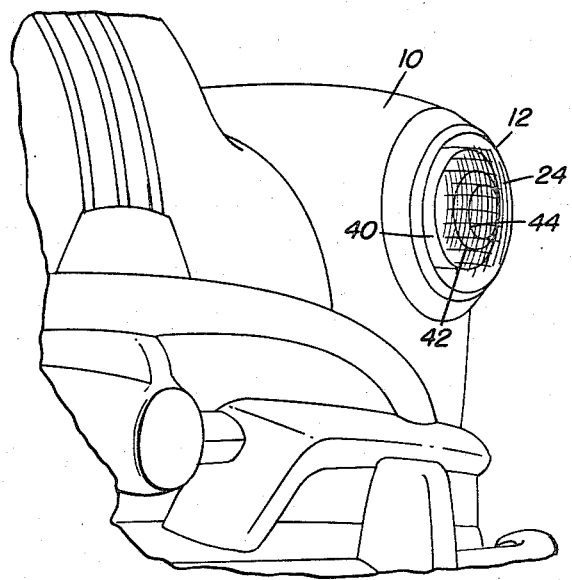
Figure 2:
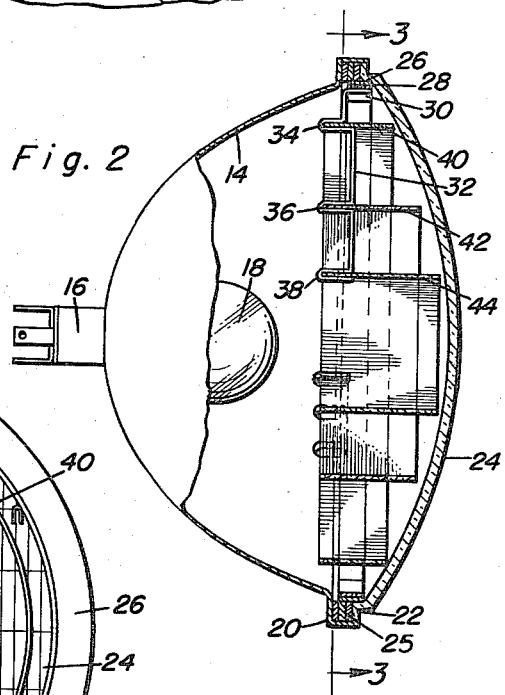
Figure 3:
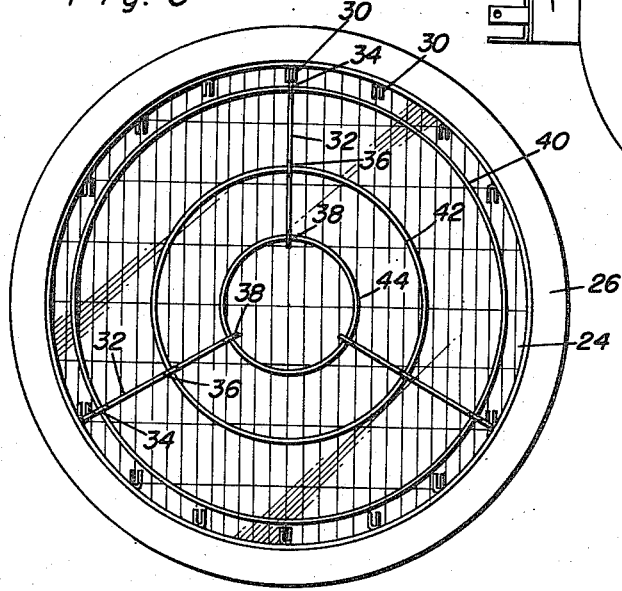

These, together with the various ancillary objects and features of the invention which will become apparent as the following description proceeds, are attained by this anti-glare headlight, a preferred embodiment of which has been illustrated in the accompanying drawings, by way of example only, wherein:

Figure 1 is a perspective view showing the antiglare headlight comprising the present invention as operatively installed on a contemporary automobile;

Figure 2 is a vertical sectional view illustrating the construction of the anti-glare headlight and particularly disclosing the manner in which the concentric strips of light polarizing material are held in spaced relationship; and, Figure 3 is an elevational view showing the lens of the anti-glare headlight with the outer ring for supporting the clips to which the concentric strips of light polarizing material are attached.

With continuing reference to the accompanying drawings wherein like reference numerals designate similar parts throughout the various views, reference numeral 10 generally designates an automobile on which the antiglare headlight comprising the present invention and generally indicated by the reference numeral 12 is adapted to be attached. This anti-glare headlight is adapted to be used on any conventional make or model of automobile and is adapted to be generally used in conjunction with "sealed beam" headlights. As is conventional there is provided a reflector type casing 14 within which a socket 16 for attachment to a suitable source of electric power extends. Within the socket 16 there is provided a lamp 18 which when excited provides a source of illumination. The reflector casing 14 terminates in an outer peripheral securing flange 20 within which a peripheral flange 22 of a concave lens 24 is adapted to seat. Suitable gasketing material 25 is provided for insuring watertightness between the lens 24 and the flange 20 of the casing 14 thus sealing the lamp 18 within the casing 14. Secured to the inner surface 26 of the outer flange 22 is a ring 28 of suitable material which has a plurality of substantially U-shaped support lugs 30 attached thereto. Engaging the U-shaped lugs 30 are clips 32 each of which are provided with rearwardly extending portions 34, 36 and 38. Within these substantially U-shaped rearwardly extending portions 34, 36 and 38 there are positioned preferably three concentric rings of light polarizing material 40, 42 and 44 which may be held in position by a suitable cement. The concentric rings 40, 42 and 44 are formed from strips of material which are adapted to polarize light passing therefrom along planes normal to the plane of the next adjacent strip of light polarizing material and may be formed from that polarized substance now sold under the trade mark "polaroid." This will prevent light rays emanating from the lamp 18 or reflected from the reflector surface of the casing 14 from passing out of the headlight at an angle of considerable degree relative to the path of the travel of the vehicle 10. This is because the light polarizing material will effectively prevent passage of rays of light which have been polarized in one direction through another strip of light polarizing material which is adapted to polarize light in a plane normal to the polarizing plane of the first strip of material through which the light rays have passed.

It is to be noted that the U-shaped lugs 30 have been arranged in seven vertical pairs or sets which are adapted to receive vertical strips of light polarizing material therebetween. This provided means for decreasing the glare but it is not quite effective as the preferred embodiment shown in Figures 1 through 3.

The inner ring 44 is thicker than the next outer ring 42 and extends forwardly thereof. Likewise, the ring 42 extends forwardly of the ring 40. This permits the rings to seat adjacent the concave inner surface of lens 24.

Since from the foregoing, the construction and advantages of this anti-glare headlight are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to.

What is claimed as new is as follows:

An anti-glare headlight comprising a source of illumination spaced from an outer substantially transparent lens, light ray controlling means positioned between said source of illumination and said lens comprising a plurality of strips of light polarizing material, each of said strips polarizing light in a plane normal to the polarizing plane of the next adjacent strip, each of said strips being circular in shape and being concentric with each other, said lens having a concave inner surface, the inner of said concentric strips extending further outwardly from said source of illumination than the next adjacent outer strip, and means for holding said strips in spaced relationship including an outer support ring secured to said lens, and clips secured to said strips and said ring, each of said clips having a plurality of forwardly extending loops embracing said strips.

References Cited in the file of this patent

UNITED STATES PATENTS

| Number | Name | Date |
|---|---|---|
| 1,734,022 | Short | Oct. 29, 1929 |
| 1,966,769 | Smith | July 17, 1934 |
| 2,142,395 | Herron | Jan. 3, 1939 |
| 2,263,684 | Ryan | Nov. 25, 1941 |
| 2,370,084 | Smith | Feb. 20, 1945 |
| 2,437,522 | Handler | Mar. 9, 1948 |

FOREIGN PATENTS

| Number | Country | Date |
|---|---|---|
| 737,765 | France | Oct. 10, 1932 |